United States Patent [19]

Legner

[11] Patent Number: 5,823,072
[45] Date of Patent: Oct. 20, 1998

[54] VEHICLE DRIVE SYSTEM

[75] Inventor: Jürgen Legner, Friedrichshafen, Germany

[73] Assignee: ZF Friedrichshafen AG, Frieddrichshafen, Germany

[21] Appl. No.: 793,387

[22] PCT Filed: Sep. 1, 1995

[86] PCT No.: PCT/EP95/03440

§ 371 Date: Feb. 21, 1997

§ 102(e) Date: Feb. 21, 1997

[87] PCT Pub. No.: WO96/07840

PCT Pub. Date: Mar. 14, 1996

[30] Foreign Application Priority Data

Sep. 7, 1994 [DE] Germany .............................. 4431864.2

[51] Int. Cl.$^6$ .................................................. F16H 47/02
[52] U.S. Cl. .................................................... 74/733.1
[58] Field of Search .............................. 74/731.1, 732.1, 74/733.1

[56] References Cited

U.S. PATENT DOCUMENTS

| | | |
|---|---|---|
| 4,368,623 | 1/1983 | Mizuno et al. . |
| 4,766,779 | 8/1988 | Massay ................................. 74/733.1 |
| 4,939,954 | 7/1990 | Walzer et al. ......................... 74/733.1 |
| 5,505,113 | 4/1996 | Wiest .................................... 74/733.1 |
| 5,605,515 | 2/1997 | Fredrikson ............................. 74/733.1 |
| 5,678,463 | 10/1997 | Brambilla et al. ..................... 74/733.1 |

FOREIGN PATENT DOCUMENTS

| | | |
|---|---|---|
| 0 339 202 | 11/1989 | European Pat. Off. . |
| 2 307 550 | 8/1974 | Germany . |
| 26 52 976 | 5/1978 | Germany . |

OTHER PUBLICATIONS

Henry W. Nikolaus, "Oilhydraulik and Pneumatic" 37 (1993, pp. 836 to 845).

*Primary Examiner*—Dirk Wright
*Attorney, Agent, or Firm*—Davis and Bujold

[57] ABSTRACT

The vehicle drive system for mobile hydraulics has a hydrostatic power transmission and a multi-speed selector gear. When the gears are shifted, the speed of the hydrostatic variable displacement motor is controlled in such a way that synchronous engine speeds are set on the engaging elements. Thus, during upshifting, a directional valve is shifted into a neutral position and afterward shifted back into the basic position. For downshifting there is a synchronizing valve that replaces a control pressure, which is dependent on the speed of a primary drive motor with a constant maximum charge pressure. As a result, the engine speed of the hydrostatic variable displacement motor reaches, in the shortest time possible, the engine speed that matches the ratio range in the transmission. Following synchronization the gearshift system runs without detectable engagement jerks.

9 Claims, 3 Drawing Sheets

VEHICLE DRIVE SYSTEM

Vehicle drive systems having a hydrostatic power transmission and a multi-speed change-speed gear have been used for mobile construction and working machinery such as wheel loaders, excavator loaders, stacker trucks, forest tractors, graders, mobile cranes, garbage vehicles, sweepers, airport service machines, etc. They are distinguished by a high power density, a freely mobile arrangement of input and output, the capacity to move oscillating and rotating actuators and the economic solution of complex driving problems.

BACKGROUND OF THE INVENTION

Compared to hydrostatic drive systems with stationary insert associated with the industry of hydraulics, far higher requirements are placed on drive systems of the mobile hydraulics, since they always have to perform outdoors and also very often in pathless grounds and, in part, have to carry out heavy work while moving. To the special requirements belong insensitivity: to shocks and vibrations; to torsional vibrations of the internal combustion engine; to weather changes, humidity, rain, water, dust and dirt and sun radiation; to electrostatic and electromagnetic influences and a broad operating temperature range between −25° C. and +90° C.

This is taken care of by additional coolers and as a rule with a beta $20 \geqq 75$ bypass filtration or, in special cases, by a 5 μm pressure filtration using servo valves. To this are added safety requirements against breakage and failure of structural parts and functions, the same as measures used to ensure operation in emergency. Used for this purpose are hermetically sealed check valves designed as seat valves which are placed on the cylinder connection also having the function of pipe breakage security. For reasons of safety, in the pressure filtration optical acoustic-electronic clogging notices and warning devices are further provided. There have been used for said purposes electrical or electronic control and regulation components which, in addition, offer securities against cable breakage, short circuit, computer failure and failure of electric and electronic parts, together with mechanical safety components, pipe breakage securities, anti-vibration high-pressure bolt connections, interlocking of movable units, mechanical emergency operations. For important parts and functions, a redundancy is provided which is designed in different manners depending on possibility. In an emergency, a drive home must be possible even with limited functions. (LIMB-HOME-Technik).

These mobile working machines operate at a relatively low driving speed substantially below 50 km/h. High traction is often needed here. In order to simplify the work, to adapt the drive system to changing operating conditions and to maximum performance or to partial load from economic and ecologic points of view, these and the maximum load must, to a great extent, be automatically controlled. Finally, the working machines must be easy to operate.

In mobile drive systems one hydraulic pump supplies, as a rule, several sinks. Variable displacement pumps, that is, pumps with variable displacement volume, allow dosing of the sink currents and adaptation of the sink power to the available driving power of the internal combustion engine.

For sinks working independently of each other, pumps are used having an open-circuit operation which without cavitation suck, even at maximum speeds of a diesel engine. They can be easily coordinated with several sinks and can move both linear and rotary actuators. Consequently, they are used in almost all cylindrical drive systems and rotary drive systems whose reversal of direction of rotation or working problems are of secondary importance.

Closed circuits are selected as a rule for drive systems and other rotary sinks. They are easy to reverse on the output and can support themselves on the driving machine when braking whereby the cooling efficiency is reduced and the brakes wear less quickly. If several pumps are used, the energy flowing back can be relayed to other drive systems. In addition, the volume of oil required in closed circuits is substantially smaller than in open circuits in relation to the power transmitted.

The mobile working machines are as a rule driven by a primary drive system, via a hydrostatic transmission consisting of a pump and a motor, which work in closed circuit.

For reasons of energy, hydraulic drive systems today are equipped with greater outputs and longer switch-on time on the primary side and also partly on the secondary side with adjusting units, predominantly axial piston units. In port-controlled axial piston machines, helical-disc designs are preferably used as pumps and helical axis designs as motor. Two auxiliary pumps driven by the drive motor, namely, one feed pump and one control pump, produce the system pressure and the control pressure. One auxiliary pump with one distribution system can be used instead of two auxiliary pumps.

A multi-speed mechanical selector transmission, which can conveniently be designed as a powershift transmission, reduces the construction volume and the construction outlay of the hydrostatic transmission, since the purely hydraulic range is repeatedly traversed. Control devices with signal transmitters, signal processors and adjusting devices, feed and control pumps, the same as an energy supply and control by added devices like pressure-limiting valves, similar to pressure-limiting valves are, to a great extent, integrated in the pump or the motor.

Lifting-piston internal combustion engines, such as diesel or otto motors, are used as a primary drive. Often they increasingly have an electronic control by which the power, the speed and/or the torque are regulated according to motor parameters, driving parameters, working parameters and environmental parameters. For control and as a control variable not only the parameters but also the changes thereof over time are directly measured and integrated in the control. Therefrom other combined control parameters and characteristic variables are further mathematically formed and processed with preset nominal variables, characteristic lines and performance graphs, it being possible adaptively to adjust the desired values to changed operating conditions.

Electromotors with speed control can also be used as primary driving mechanisms. Electromotors controlled by frequency and pulse width are adequate for this.

Behind the primary drive is often a transfer transmission through which the power of the primary drive is distributed to the drive system and the implements. The power can also be hydrostatically distributed by the primary drive operating a pump which supplies both the implements and the drive system.

The hydrostatic pump, which can also be designed as a variable displacement pump, is often directly flanged on the drive motor or driven by an adequate driving means such as a V-belt transmissions, etc. It works together with a hydrostatic motor with which it is hydrostatically connected. The hydrostatic motor, which can be designed as a constant or a variable displacement motor, drives the input shaft of a speed-change gear. The range of adjustment of the hydrostatic transmission is determined by the different flow and displacement volume of the hydrostatic units. The torque of the hydromotor results from pressure produced by the hydrostatic pump and controlled by a control unit, the same as the displacement volume of the hydromotor.

The control unit usually effects a so-called automotive control, that is, the hydrostatic pump and/or the hydrostatic motor, are automatically controlled depending on the speed of the primary drive. To said control are superposed other controls and regulations in accordance with the above mentioned parameters and control variables.

The multi-speed change-speed gear can be designed as a countershaft transmission, but transmissions in planetary design are often found, since their substantially axially symmetrical external outlines adapt well to the external outlines of the hydrostatic motor. Thereby the hydrostatic motor and the change-speed gear can be combined without difficulty to form a structural unit. On the other hand, transmissions in countershaft design make an axial offset between the input and output shafts possible.

For simple utilizations, a transmission with straight-cut gears are sufficient while for higher loads and requirements on the noise level helical cut gears are preferred. Powershift elements which are actuated pneumatically, hydraulically, electromagnetically, or by springs contain friction clutches with one-faceted or multi-faceted friction elements in the shape of discs or friction cones. In order to shift the drive system to a secure state in case of failure of the control or of the energy supply, the clutches are often closed by spring tension and opened by a controllable auxiliary force. But a reverse actuation of the clutch is also possible. Electromagnetic proportional valves control the supply of pressure medium to the powershift elements. By electronic control devices they are clocked and modulated by pulse width (PWM).

The control device for the drive system consists of operating elements, signal transmitters, signal converters, one signal processor, one actuator system and one display. The operating elements must be as simple as possible. A multi-functional lever is often used. The signal transmitters make signals available according to control variables and control parameters and detect other possible interference levels.

The signal converters convert the signals of the signal transmitters for the signal processing. They also adapt the signals to the signal processing for the actuator system. The signal processing links, in a logical manner, input signals with the preset nominal variables and transmits corresponding signals to the actuator system. It can basically be designed mechanical, hydraulic, pneumatic, electronic, or by the microprocessor technique. More modern devices are designed in the microprocessor technique. They consist of a microprocessor, data and program memories. In control devices of that kind, it is possible to use function modules which are related to certain uses such as automatic driving, constant driving speed, constant output speed, hydrostatic brakes, differential locks, drive-drag control, reversals, inchen, maximum load control, traction limitation, speed-dependent traction, gearshifting, synchronous two-circuit transmissions, safety monitoring, parameterizing, diagnosis, time function, etc.

On one indicator display, important and other data, states and interferences can be shown to the driver in a distinctive arrangement and an easily detectable form.

The prior art relative to drive systems of the kind is extensive, for example, "Oilhydraulik and Pneumatik" 37 (1993, pages 836 to 845). Nevertheless, a number of problems still have not been satisfactorily solved, for example, it still is not possible to control the transitions from gear to gear with delicate sensitivity and to avoid engagement jerks when gearshifting.

For this purpose it is known, DE-A1-26 52 976, to synchronize the speeds of the shifts to be coupled by accordingly changing the speeds of the hydrostatic transmission or of the drive motor when shifting the mechanical selector transmission. If this is done with traction interruption, then the duration of the traction interruption must suffice for adjusting the speed. For many situations, however, it is not desirable to interrupt the traction for a long time. The selector transmission can be further relieved by actuating, during the shifting operation of the selector transmission, a short-circuit valve in a hydrostatic transmission with a closed circuit or a relief valve in a hydrostatic transmission with an open circuit so that during this period of time no torque, or only a reduced torque corresponding to the capacity of load of the selector transmission, is transmitted to the hydrostatic transmission.

There has further been disclosed a gearshifting device for a hydraulic-mechanical drive system, DE-C2-23 07 550, where during the shifting of the selector transmission, the hydrostatic pump is adjusted in the sense of a speed adaptation of the clutch parts to be shifted. This is done by an adjusting device pressurized by the different pressure of two speed pressure transmitters coordinated with the corresponding shifting elements. The gearshift device is very expensive and susceptible to problems due to the multiplicity of parts.

SUMMARY OF THE INVENTION

The invention is based on the problem of improving by simple means the shifting quality of a drive system in the conditions of use described above.

The invention is particularly advantageous in drive systems having a ratio range of approximately three or more in the selector transmission. By ratio range it is understood the ratio of the reductions of two adjacent gears. In selector transmissions of this kind, the upshifts have no problems in relation to hydrostatic drive systems, but the great ratio ranges during downshifting is a major disadvantage. According to the invention, during a synchronization period, when shifting from a higher to a lower gear, the speed-dependent control pressure on the hydrostatic unit is replaced by the maximum constant control pressure or charge pressure so that the hydrostatic unit reaches, at a maximum variable speed, the synchronous speed desired for gearshifting.

In order that the valve is active independently of the travel direction of the drive system, it is connected between a valve for regulating the control pressure and a directional valve, and the valve is conveniently an electromagnetic valve and can be controlled by an electronic control device. It is thus ensured that the hydrostatic pump is always adjusted in the correct direction.

To obtain the synchronous speed of the parts to be coupled and thereby accelerate the shifting operation as quickly as possible, it is convenient that both the hydrostatic pump and the hydrostatic motor are an adjusting unit so that both can be simultaneously adjusted in accordance with the problem that arises.

If the shifting operation is terminated in the selector transmission, the valve shifts again to the speed-dependent control pressure and the drive system is again automatically controlled, as usual, by the speed of the driving machine and the desired road speed.

For the sake of safety of the drive system, shifting elements which are closed by spring tension and opened by hydraulic pressure are conveniently used for gear changes. Thereby, in case of failure of the hydraulic system, it is ensured that the vehicle remains parked and does not roll.

In combination with a microprocessor, advantageous processes for shifting the drive system can be carried out with the drive system of the invention. The invention is distinguished by the fact that during different travel situations, different shifting cycles can be realized, in fact, at very low speeds until stopping, a powershift is obtained by the timed overlapping during the actuation of the gearshift elements. When starting from a preset road speed, the timed sequence of the shifting cycles is controlled and regulated in a manner such that gearshifting is obtained with a shift interruption of traction. Since the speeds are synchronized at a constant maximum variable speed, the program cycle can be preset in a microprocess control with simple periods which, of course, depend on the road speed and additionally can be adapted when environmental influences change.

DESCRIPTION OF THE PREFERRED EMBODIMENT

Figure 1:
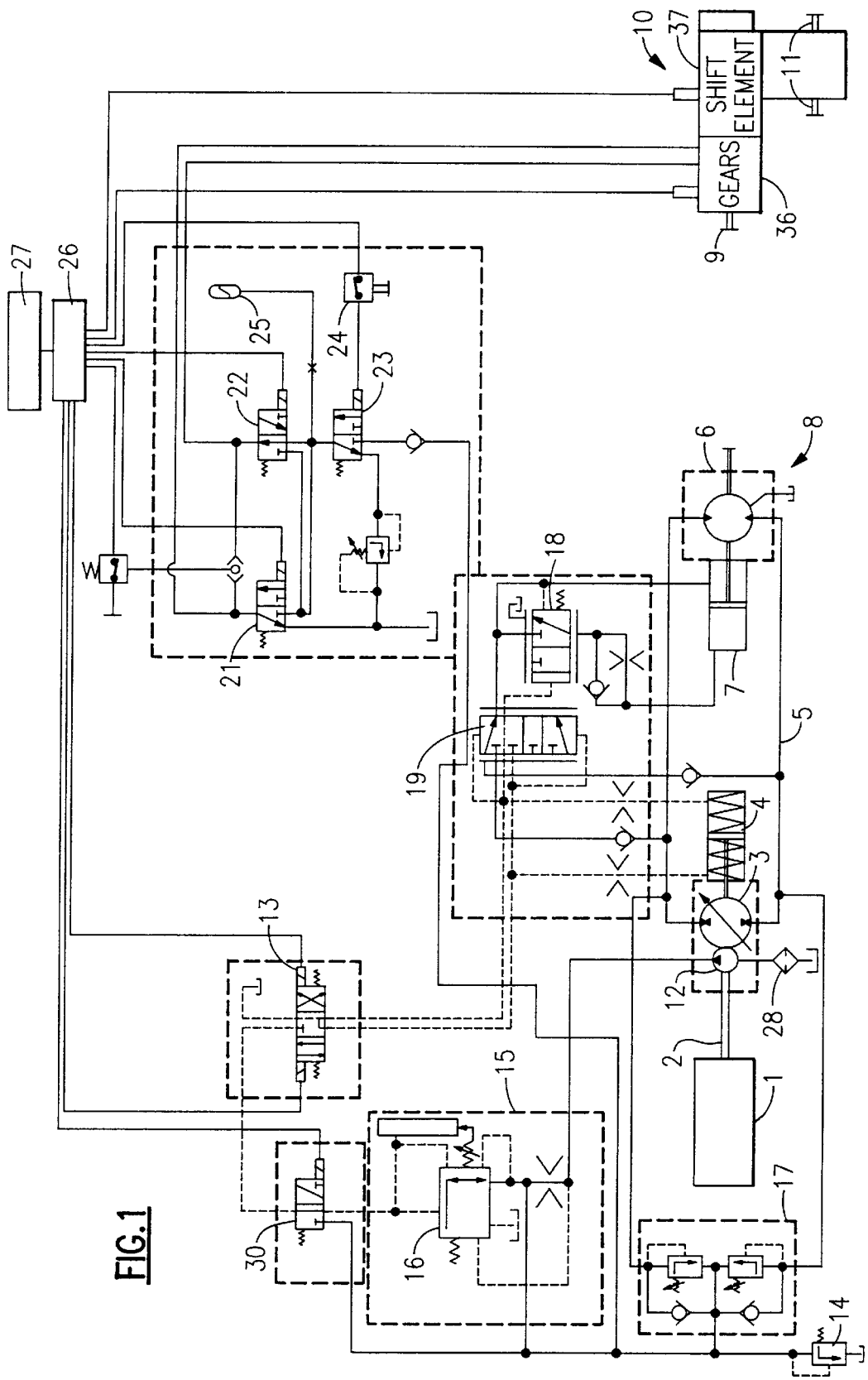
FIG. 1 shows the diagrammatic design of a drive systems according to the invention.

A primary drive motor 1, which as a rule is a lifting piston internal combustion engine, drives a hydrostatic variable displacement pump 3, whose adjusting unit is designated with a 4, via an input shaft 2. The variable displacement pump 3 works in a closed hydraulic circuit 5 together with a hydraulic variable displacement motor 6 whose adjusting unit is designated with a 7.

An output shaft 8 of the variable displacement motor 6 is connected, in a manner not shown, in a countershaft or a planetary design with an input shaft 9 of a two-step or multi-step mechanical selector transmission 10, having gears 36 actuated by shifting elements 37, which, via a distributor step and output shafts 11, drives vehicle gears, not shown in detail.

The electronic-hydraulic control of the vehicle drive system comprises one auxiliary pump 12 as a control and feed pump, a device for selecting the direction of travel with a directional valve 13, a device for keeping constant a charge pressure with a pressure-limiting valve 14, a device 15 for regulating a control pressure according to the speed of the drive motor 1 with a flow-dependent pressure-control valve 16, a device 17 for limiting the high pressure in the closed circuit 5, a control valve 18 for the variable displacement motor 6, a valve 19 for detecting the direction of travel, a device 20 with gear-change valves 21, 22, a brake valve 23, a switch 24 for the parking brake, a hydraulic memory 25 and other auxiliary valves. Instead of one auxiliary pump 12, two pumps can be used for control or supply purposes. But in the preferred embodiment only one pump with a distribution of the pump current is used.

The hydraulic valves are electromagnetic valves which are controlled by an electronic system 26 with a microprocessor. Together with driving, operating and environmental parameters, the electronic system processes position signals of a selector switch 27. With the latter, both the direction of travel and the gears and optionally an automatic operation can be selected.

The auxiliary pump 12, upon the input shaft 2 of the drive motor, conveys pressure medium via a filter 28 to the shifting device 20. Part of the flow rate of the auxiliary pump 12 leads to the pressure control valve 16 which produces control pressure in accordance with the speed of the drive machine 1. The pressure normally crops up on the directional valve 13. If said valve is controlled by the electronic system 26, as a result of the corresponding position of the selector switch 27, the speed-dependent control pressure is transmitted to the adjusting device 4 of the variable displacement pump 3 and via the valve 19, for detection of the direction of travel, to the control valve 18 which governs the adjusting device 7 of the variable displacement motor 6.

If the synchronizing valve 30 is controlled, the speed-dependent control pressure is cut off and the charge pressure cropping up before the pressure-control valve 16 is switched to the directional valve 13. Thereby the variable displacement pump 3 and the variable displacement motor 6 are adjusted to the position of a minimal ratio which corresponds to the ratio range in the selector transmission 10. Thereby a synchronous speed in the elements to be shifted is obtained. After complete shifting of the selector transmission 10, the synchronizing valve 30 again shifts to the initial position, that is, the variable displacement pump 3 and the variable displacement motor 6, owing to the speed-dependent control pressure, assume a position which is dependent on the speed of the drive motor 1.

Figure 2:
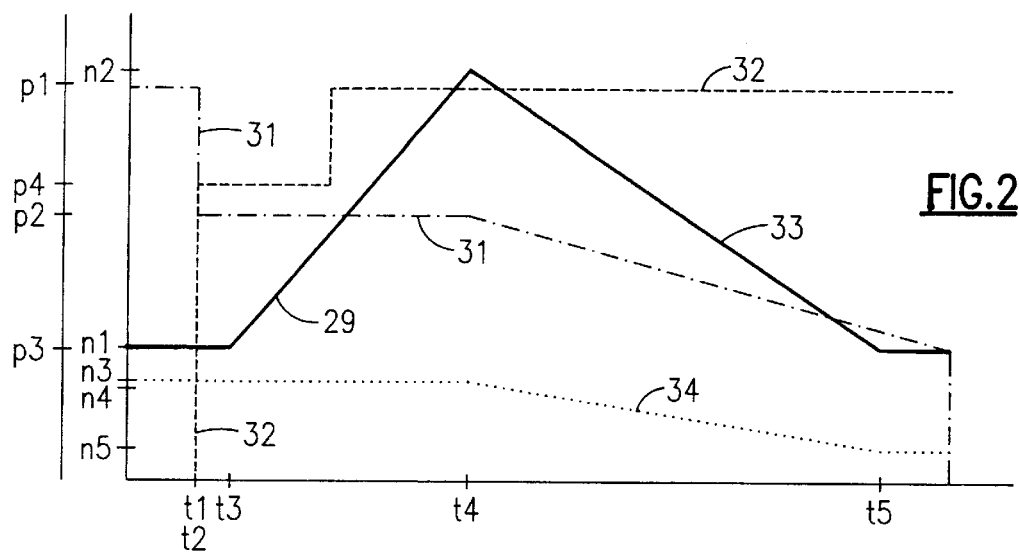
FIG. 2 to FIG. 4 show the timed curve of control pressures, speeds and torques during a downshift.

FIG. 2 shows a shifting cycle in a downshift during high road speed with a constant position of the accelerator pedal. In FIGS. 2 to 7, the actuating pressure of the shifting elements of the selector transmission 10 is designated with p, the speed with n, the time with t and the torque with T. The indices characterize the different values corresponding to the process cycle. It is also to be taken into account that the shifting elements are closed by spring tension and opened by hydraulic pressure.

The shifting operation starts with the closing operation of the open shifting element, in this case a brake of a planetary transmission, but according to the line 31 at the $t_1$ moment only to an extent such that no torque is yet transmitted. Simultaneously the closed shifting element, in this case a clutch of the planetary transmission, is opened according to the line 32 at the $t_2$ moment. Thereafter, a torque interruption immediately occurs. Instead of one clutch and one brake as shifting elements, several clutches and/or brakes can also be used in multi-speed transmissions.

The variable displacement motor 6 rotates at a speed $n_1$. For the sake of safety, a waiting period is observed between $t_1$ and $t_3$ in order that no torque is transmitted with certainty any longer. At the $t_3$ moment the synchronization valve 30 is actuated whereby the speed of the variable displacement motor 6 according to the line 33 to $t_4$ rises to $n_2$.

The gradient of the distance 29 is a standard for the maximum variable speed of the hydrostatic unit. Said speed is dependent on the height of the maximum control pressure or charge pressure and the structural data of the variable displacement pump and of the variable displacement motor with their adjusting units 4 and 7. At $t_4$ the synchronization operation is terminated. The synchronizing valve 30 returns to the basic position whereby the speed-dependent control pressure again becomes active and the brake increasingly transmits torque. At the same time, the output speed drops to a new value $n_5$ while the speed of the variable displacement motor 6 reassumes the initial value $n_1$. The line 34 shows the curve of the speed on the output shaft 11 of the selector transmission 10.

Figure 3:
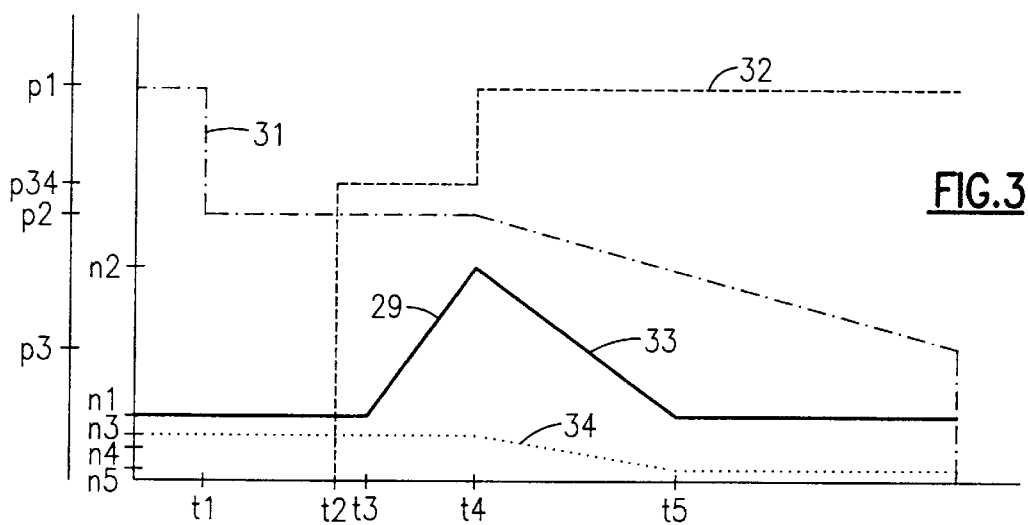

FIG. 3 shows a downshift operation at medium road speed. It runs similarly to the higher road speed. Therefore, the same numerals have been used. But since the speed step corresponding to the gear step in the selector transmission 10 is clearly lower, at the same variable speed of the hydrostatic unit, the synchronization time $t_3$ to $t_4$ and the time for returning the speed of the variable displacement motor to the basic speed $t_4$ to $t_5$ can be substantially shorter so that the whole shifting time, with traction interruption, is very short. The variable speed is constant. The gradient $n_2$ $(t_4/n_1 (t3)$=constant and $n_1 (t_5)/n_2 (t_4)$=constant.

Figure 4:
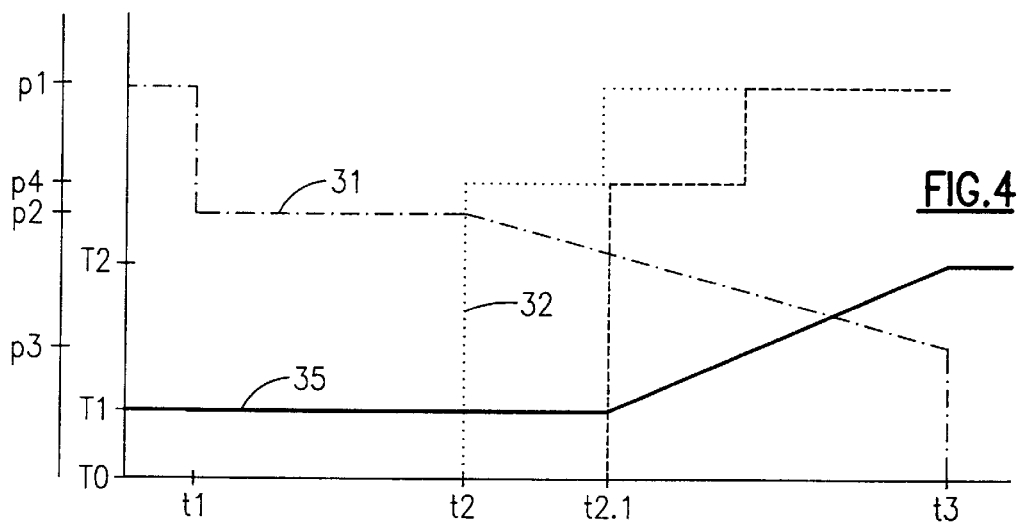

FIG. 4 shows a downshift operation in down time or at very low speeds under load. No synchronization is required here so that a cross-over shifting can be effected without difficulties. From the time $t_2$ on the brake begins to transmit torque. The transmissible torque increases in proportion to the pressure drop from $p_2$ to $p_3$ within the interval from $t_2$ to $t_3$. If, at the $t_2$ moment, the clutch were completely open, the output torque suddenly goes back from $T_1$ to $T_0$, which would result in an undesired interruption of traction. Therefore, the clutch, which until then had been closed, opens beginning at $t_{2.1}$. The load take up from the clutch by the brake occurs continuously and is terminated at the $t_3$ moment at the latest. Shortly after $t_{2.1}$, the hydromotor beings to rotate quicker and brake slidingly builds up from the increasing torque.

Figure 5:
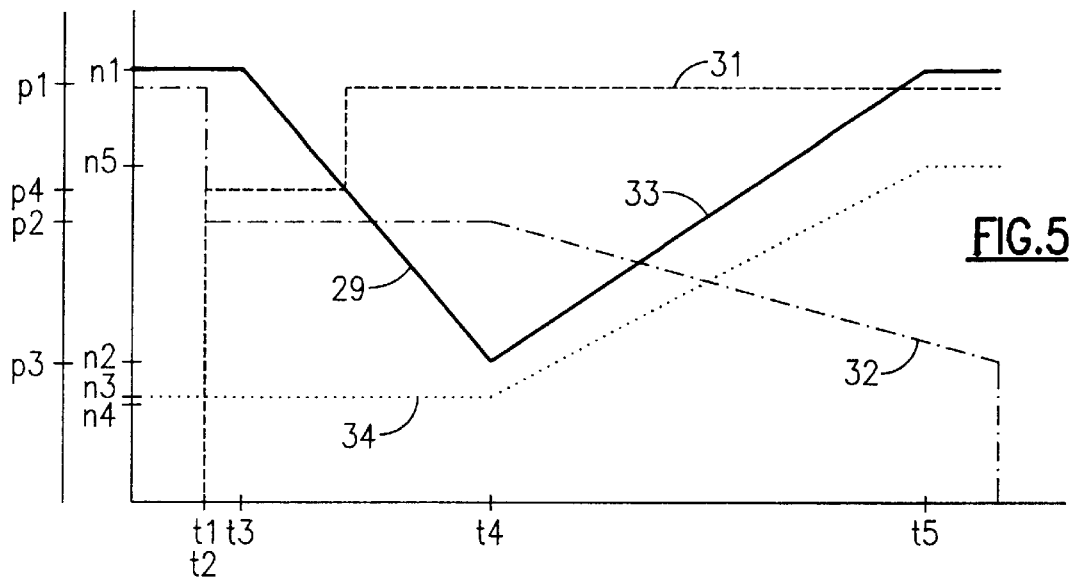
FIG. 5 to FIG. 7 show a corresponding timed curve of control pressures, speeds and torques during an upshift.
Figure 6:
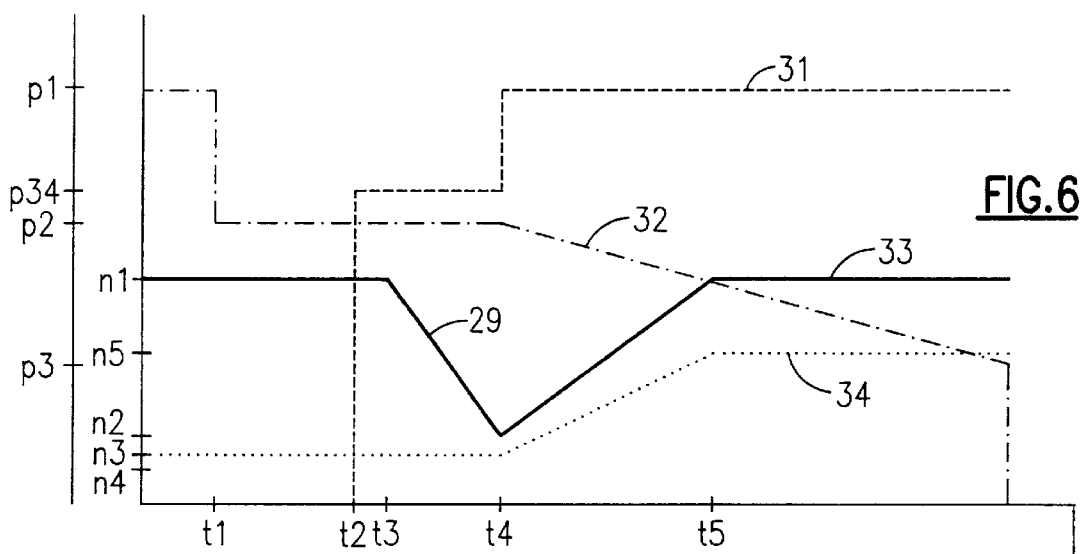
Figure 7:
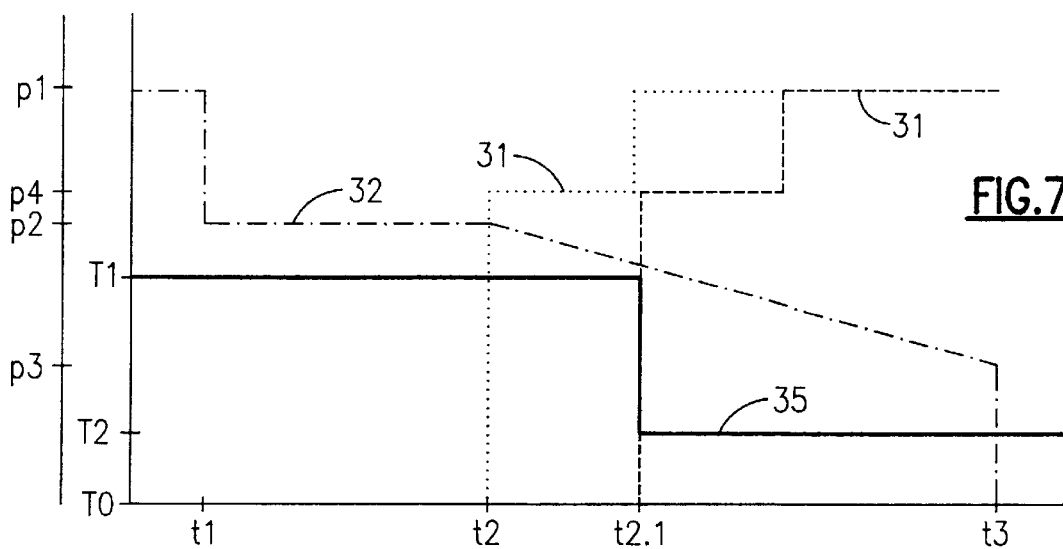

FIGS. 5 to 7 show upshift operations. They run similarly to the downshift operations, but in this case, the brake opens and the clutch, in turn, closes. Starting from the $t_3$ moment until the $t_4$ moment, the speed of the variable displacement motor 6, during shifts at high and medium speeds, is lowered by the fact that the directional valve 13 has been shifted to a neutral position. Thereby the hydrostatic unit is reset from $n_1$ to $n_2$ which corresponds to the gear ratio of the selector transmission 10. Starting from the $t_4$ moment, the directional valve 13 is returned from the neutral position back to the former shifting position so that the pressure modulation, dependent on the speed of the drive motor 1, is again introduced and the speed of the variable displacement motor 6 is returned to the basic speed. At the same time, the speed on the output shafts of the selector transmission 10 increases according to the gear ratio.

FIG. 7 shows a shifting operation during down time or at very low speed. The same as during the downshift operation of FIG. 4, no synchronization is required here. To prevent a traction interruption, a cross-over control of the shifting elements is also carried out in this case.

In the specification and in the claims only a few possible combinations are shown in detail relation to the design and use. It is recommended to the reader to consider each statement separately and to verify its applicability in other situations and combinations, especially in relation to the stated prior art. Obvious possibilities result to the expert when he applies the steps described because of the advantages related to them.

| Reference numerals | |
|---|---|
| 1 primary drive motor | 18 control valve |
| 2 input shaft | 19 valve |
| 3 hydrostatic variable displacement pump | 20 device |
| | 21 gearshift valve |
| 4 adjusting unit | 22 gearshift valve |
| 5 circuit | 23 brake valve |
| 6 hydrostatic variable displacement motor | 24 switch for parking brake |
| 7 adjusting unit | 25 memory |
| 8 output shaft | 26 electronic system |
| 9 input shaft | 27 selector switch |
| 10 selector transmission | 28 filter |
| 11 input shafts | 29 distance |
| 12 auxiliary pump as control and feed pump | 30 synchronizing valve |
| | 31 brake (pressure curve) |
| 13 directional valve | 32 clutch (pressure curve) |
| 14 pressure-limiting valve | 33 variable displacement motor (speed curve) |
| 15 device for producing a speed-dependent control pressure | |
| | 34 output shafts (speed curve) |
| 16 pressure-control valve | 35 output shafts (torque curve) |
| 17 device for limiting the high pressure | |

I claim:

1. A drive system having a drive motor (1) driving a feed pump (12) and a hydrostatic variable displacement pump (3), said drive system having a hydrostatic motor (6) which, with said variable displacement pump (3), forms a closed hydrostatic circuit (5) and drives a powershiftable selector transmission (10), and a plurality of devices for selecting a direction of travel and constantly maintaining a charge pressure for regulation of a control pressure being dependant upon a speed of said drive motor (1), and the maximum control pressure corresponding to the charge pressure, wherein a synchronizing valve (30) is provided so that when shifting to a lower gear, during a synchronization period, a switch from the speed-dependent control pressure to the constant charge pressure occurs.

2. The drive system according to claim 1, wherein said synchronizing valve (30) is an electromagnetic valve which is located between a valve (16) for regulating the control pressure and a directional valve (13).

3. The drive system according to claim 1, wherein said hydrostatic motor (6) is an adjusting unit.

4. The drive system according to claim 1, wherein a plurality of control devices are controlled by a microprocessor located within an electronic device.

5. The drive system according to claim 1, wherein said drive system further includes a plurality of shifting elements for changing gears which are engaged by spring tension and disengaged by hydraulic pressure.

6. The drive system according to claim 1, wherein said drive system further includes a plurality of shifting elements for changing gears which are engaged by control pressure and disengaged by hydraulic pressure.

7. The drive system according to claim 1, wherein said drive system further includes a first shifting element to disengaged an engaged gear and a second shifting element to engage a second gear, when changing to the second gear at a low road speed diminishing to a stop, said second shifting element starts an engaging operation and transmits torque before said first shifting element disengages and is free of load, when starting from a preset road speed, said first shifting element disengages before said second shifting element transmits torque and after a defined interval, after an interruption in traction, the speed of said hydrostatic motor (6) at an approximately a constant variable speed is one of controlled and regulated to a value which corresponds to a reduction ratio of the new gear at the preset road speed and, at this moment, said second shifting element engages and transmits torque.

8. The drive system according to claim 7, wherein the speed of said hydrostatic motor (6) is obtained, when changing to a higher gear, by adjustment of said directional valve (13) to a neutral position and, when changing to a lower gear, by pressurization of two adjusting devices (4, 7), via said synchronizing valve (30), with the charge pressure by said variable displacement pump (3) and said hydrostatic motor (6).

9. The drive system according to claim 7, wherein, when starting from a gear-change signal, said first and second shifting elements and said synchronizing valve (30) are actuated to determined preset points of time depending upon a road speed and a maximum variable speed of said electronic control device and said hydraulic control device.

* * * * *